United States Patent
Hosokawa et al.

(10) Patent No.: US 7,498,091 B2
(45) Date of Patent: Mar. 3, 2009

(54) RECORDING MEDIUM INCLUDING A FIRST AND SECOND PRINT LAYER WITH A CONTROLLED INCLINATION ANGLE AND METHOD OF MAKING THE SAME

(75) Inventors: Tetsuo Hosokawa, Kawasaki (JP); Tomoyuki Aita, Higashine (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 11/120,107

(22) Filed: May 2, 2005

(65) Prior Publication Data

US 2005/0208258 A1 Sep. 22, 2005

Related U.S. Application Data

(63) Continuation of application No. PCT/JP03/06451, filed on May 23, 2003.

(51) Int. Cl.
*G11B 5/72* (2006.01)
(52) U.S. Cl. .................. 428/825; 428/833; 428/213; 428/216; 360/131
(58) Field of Classification Search ............ None
See application file for complete search history.

(56) References Cited

U.S. PATENT DOCUMENTS

| 5,616,447 A | 4/1997 | Arioka |
| 5,805,563 A | 9/1998 | Nakano |
| 6,465,071 B1 | 10/2002 | Satoh et al. |
| 6,641,890 B1 | 11/2003 | Miura et al. |
| 6,893,699 B2 * | 5/2005 | Ito et al. .......... 428/64.1 |

FOREIGN PATENT DOCUMENTS

| DE | 197 23 417 A1 | 3/1998 |
| EP | 1 103 961 A2 | 5/2001 |
| EP | 1 302 332 A1 | 4/2003 |
| JP | 7-44923 | 2/1995 |
| JP | 9-330535 | 12/1997 |
| JP | 2001-110093 | 4/2001 |
| JP | 2001-148138 | 5/2001 |
| JP | 2002-367250 | 12/2002 |
| WO | 2004/010428 | 1/2004 |

* cited by examiner

*Primary Examiner*—Kevin M Bernatz
(74) *Attorney, Agent, or Firm*—Greer, Burns & Crain, Ltd.

(57) ABSTRACT

First and second print layers extend on the surface of a medium body in a recording medium. The first print layer has a first thickness. The second print layer has a second thickness larger than the first thickness. A print protection layer covers over the first and second print layers on the surface of the medium body. An inclined surface is defined on the surface of the print protection layer. The inventors have found that a print layer has various thickness based on the kind of colors. The difference in the thickness causes a step on the surface of the print layer at the boundary between the different colors. The inclined surface is established on the surface of the print protection layer based on the step. A smooth relative movement can thus be realized between a head and the surface of the print protection layer.

9 Claims, 6 Drawing Sheets

Relative Velocity X : 1.2 [m/s]

|  | 1 | 2 | 3 | 4 | 5 | 6 | 7 |
|---|---|---|---|---|---|---|---|
| Average Thickness [μm] | 6.30 | 4.60 | 3.20 | 2.30 | 1.80 | 1.60 | 1.40 |
| Inclination Angle α [degrees] | 0.09 | 0.11 | 0.14 | 0.23 | 0.35 | 0.43 | 0.55 |
| Vibration | NO | NO | NO | NO | NO | YES | YES |

FIG.9

Relative Velocity X : 2.4 [m/s]

|  | 1 | 2 | 3 | 4 | 5 | 6 | 7 |
|---|---|---|---|---|---|---|---|
| Average Thickness [μm] | 6.30 | 4.60 | 3.20 | 2.30 | 1.80 | 1.60 | 1.40 |
| Inclination Angle α [degrees] | 0.09 | 0.11 | 0.14 | 0.23 | 0.35 | 0.43 | 0.55 |
| Vibration | NO | NO | NO | NO | YES | YES | YES |

FIG.10

Relative Velocity X : 4.8 [m/s]

|  | 1 | 2 | 3 | 4 | 5 | 6 | 7 |
|---|---|---|---|---|---|---|---|
| Average Thickness [μm] | 6.30 | 4.60 | 3.20 | 2.30 | 1.80 | 1.60 | 1.40 |
| Inclination Angle α [degrees] | 0.09 | 0.11 | 0.14 | 0.23 | 0.35 | 0.43 | 0.55 |
| Vibration | NO | NO | NO | YES | YES | YES | YES |

RECORDING MEDIUM INCLUDING A FIRST AND SECOND PRINT LAYER WITH A CONTROLLED INCLINATION ANGLE AND METHOD OF MAKING THE SAME

This is a continuation of International Application No. PCT/JP2003/006451, filed May 23, 2003.

BACKGROUND OF THE INVENTION

1. Field of the Invention

The present invention relates to a recording medium including a medium body holding data and a print layer extending on the surface of the medium body, and to a method of making the same.

2. Description of the Prior Art

Characters and/or figures are often printed on the surface of a substrate in an optical disk such as a compact disk (CD). The characters and/or figures are utilized to represent the content of a software recorded in the CD, for example. On the other hand, characters and/or figures are not printed on the surface of a substrate in a magneto-optical disk such as a MO disk and a mini disk (MD). The existing MO disks and MD disks are contained in a cartridge, so that the characters and/or figures are printed on the outer surface of the cartridge.

The magneto-optical disk of magnetic field modulation recording type, such as MD disk, utilizes a magnetic head in contact with or flying above the surface of a substrate in writing data into a magneto-optical recording layer. A constant distance should be maintained between the magneto-optical recording layer and the magnetic head because a variation in the distance induces a variation in the intensity of the applied magnetic field. The magnetic field of the varied intensity hinders an accurate establishment of data in the magneto-optical recording layer. The magnetic head may suffer from damages if the magnetic head collides against a step formed on the surface of the substrate. Data thus cannot be written into the magneto-optical recording layer. Steps should be avoided on the surface of the substrate in a magnetic recording medium such as a magneto-optical disk of magnetic field modulation recording type.

As described above, no print is applied on the surface of a substrate in a magneto-optical disk such as a MD disk. Only guiding grooves having the depth of 100 nm approximately are asperities formed on the surface of the substrate in a magneto-optical disk. These asperities fail to influence the sliding or flying property of the magnetic head. However, an magneto-optical disk without a cartridge may directly be mounted on the driving shaft of a spindle motor in the future. A removable magnetic recording disk may be utilized even in a magnetic recording disk drive such as a hard disk drive. These cases may require print of characters and/or figures on the surface of a substrate. A print layer having a predetermined thickness forms a step on the surface of a substrate in a magneto-optical disk. The step is supposed to hinder a stable sliding or flying of the magnetic head on or above the surface of the substrate. Data cannot normally be written into the magneto-optical recording layer.

SUMMARY OF THE INVENTION

It is accordingly an object of the present invention to provide a recording medium capable of constantly realizing a superior relative movement between a head and the recording medium itself.

According to a first aspect of the present invention, there is provided a recording medium comprising: a medium body holding data; a first print layer extending on the surface of the medium body, said first print layer having a first thickness; a second print layer extending on the surface of the medium body, said second print layer having a second thickness larger than the first thickness; and a print protection layer covering over the first and second print layers on the surface of the medium body, said print protection layer having an inclined surface inclined relative to the surface of the medium body.

The inventors have found that a print layer has various thickness based on the kind of colors. The inventors have confirmed that the difference in the thickness causes a step on the surface of the print layer at the boundary between the different colors. If the inclined surface is established on the surface of the print protection layer based on the step, a smooth relative movement can be realized between a head and the surface of the print protection layer. The head may slide on the surface of the print protection layer. Alternatively, the head may fly above the surface of the print protection layer by a predetermined flying height. In any event, the head is reliably prevented from colliding against the print protection layer. The first and second print layers serve to establish multicolored ornaments on the surface of the recording medium.

An inclination angle may be set smaller than $0.49e^{-0.20X}$, where X[m/s] denotes a relative velocity between a recording track on the medium body and a head, between the inclined surface and the surface of the medium body. The inventors have proved that the setting of the inclination angle ensures a superior relative movement between the head and the recording medium in the aforementioned manner. The inclined surface may descend outward from the contour of the second print layer. Likewise, the inclined surface may descend outward from the contour of the first print layer.

The first and second print layers may be located adjacent each other. In this case, the inclined surface may be formed at the boundary between the first and second print layers. The medium body may comprise a magnetic recording layer extending on the surface of a substrate. The substrate may be made of a transparent material. The recording medium may establish a magneto-optical recording medium, for example.

At least the second print layer may be printed in mixture of the primary colors. The thickness of the print layer may vary depending on the content of inks or toners in the mixture. The adjustment of the content in the mixture serves to establish the required second thickness of the second print layer.

A method may be provided to make the aforementioned recording medium. The method may comprise: preparing a medium body holding a print layer on the surface of a substrate, said print layer printed in colors; dropping a drop of fluid of a resin material during the rotation of the medium body at a first velocity; driving the medium body for rotation at a second velocity higher than the first velocity so as to spread the fluid over the surface of the print layer based on the centrifugal force; and driving the medium body for rotation at a third velocity higher than the second velocity.

The method enables establishment of the inclined surface on the surface of the fluid of the resin material. Adjustment of the velocity of the rotation, adjustment of the duration of the rotation, and the like, may be utilized to realize a required inclination angle. The duration of the rotation at the third velocity may be set shorter than the duration of the rotation at the second velocity.

According to a second aspect of the present invention, there is provided a recording medium comprising: a medium body holding data; a first print layer extending on the surface of the medium body; a second print layer extending on the surface of the medium body at a position adjacent the first print layer, said second print layer having a thickness equal to that of the first print layer; and a print protection layer covering over the first and second print layers on the surface of the medium body.

The recording medium allows establishment of an equal thickness for the first and second print layers. No steps may be generated at the boundary between the first and second print layers. A flat surface may be established over the surface of the print protection layer. The flat surface of the print protection layer serves to ensure a smooth relative movement between a head and the surface of the print protection layer. The head may slide on the surface of the print protection layer. Alternatively, the head may fly above the surface of the print protection layer by a predetermined flying height. In any event, the head is reliably prevented from colliding against the print protection layer. The first and second print layers serve to establish multicolored ornaments on the surface of the recording medium. The boundary between the first and second print layers may cross a recording track defined on the medium body in the recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
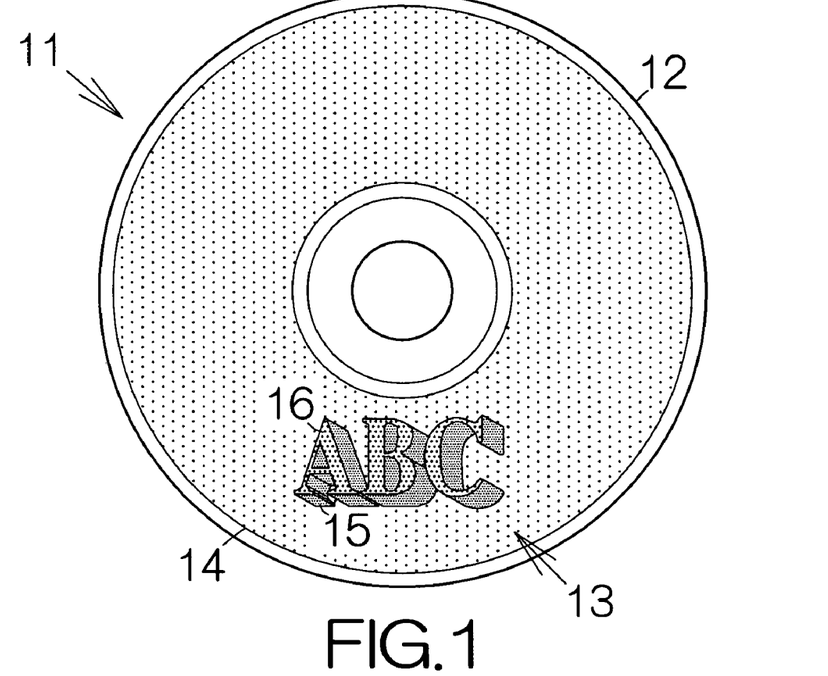
FIG. 1 is a plane view schematically illustrating the structure of a magneto-optical disk as an example of a recording medium according to the present invention.

FIG. 1 schematically illustrates a magneto-optical disk 11 as a recording medium according to a first embodiment of the present invention. The magneto-optical disk 11 may be represented by a mini disk (MD), a Magneto Optical (MO) disk, or the like.

The magneto-optical disk 11 includes a medium body 12 designed to hold data or magnetic information. The medium body 12 is formed in a disk shape. The medium body 12 will be described later in detail. Ornaments 13 are applied to the surface of the medium body 12 based on print. The ornaments 13 are printed in various colors. The ornaments 13 include a basement print layer 14 extending over the surface of the medium body 12 and first and second print layers 15, 16 received on the surface of the basement print layer 14.

Figure 2:
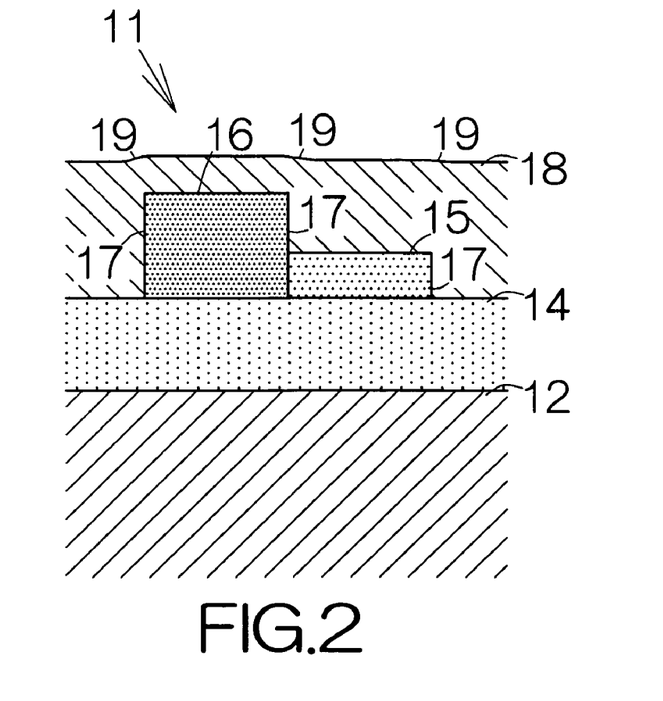
FIG. 2 is an enlarged partial vertical sectional view of the magneto-optical disk according to a first embodiment of the present invention.

FIG. 2 schematically illustrates the sectional view of the magneto-optical disk 11. The basement print layer 14 has a uniform thickness over the surface of the medium body 12. An ultraviolet setting resin ink is utilized to form the basement print layer 14, for example. The basement print layer 14 may be printed in white, for example.

An ultraviolet setting resin ink is also utilized to form the first and second print layers 15, 16. Inks of three primary colors, cyan, magenta and yellow, may be employed in this case. Various colors may be made based on mixture of the primary colors in the first and second print layers 15, 16. The thickness of the first and second print layers 15, 16 in general depend upon the colors. Here, a pure primary color may be employed to form the first print layer 15, for example. The first print layer 15 extends by a first thickness, namely the minimum thickness. Mixture of at least two of the primary colors may be employed to form the second print layer 16. Here, the thickness of the second print layer 16 is set at a second thickness larger than the first thickness. This second thickness corresponds to the maximum thickness. Steps 17 are thus defined at the boundary between the second print layer 16 and the basement or first print layer 14, 15. Steps 17 are also defined at the boundary between the first print layer 15 and the basement layer 14.

A print protection layer 18 covers over the first and second print layers 15, 16 on the surface of the medium body 12. An ultraviolet setting resin may be employed as the print protection layer 18, for example. The surface of the print protection layer 18 provides asperities reflecting the steps 17. Inclined surfaces 19 are formed on the print protection layer 18. The inclined surfaces 19 are inclined to the surface of the medium body 12. The inclined surfaces 19 descend outward from the contour of the second print layer 16. The inclined surfaces 19 likewise descends outward from the contour of the first print layer 15. The inclined surfaces 19 are positioned at the boundary between the first and second print layers 15, 16. Here, an inclination angle α is set smaller than $0.49e^{-0.20X}$, where X[m/s] denotes a relative velocity between a recording track on the medium body 12 and a magnetic head, between the inclined surface 19 and the surface of the medium body 12.

Figure 3:
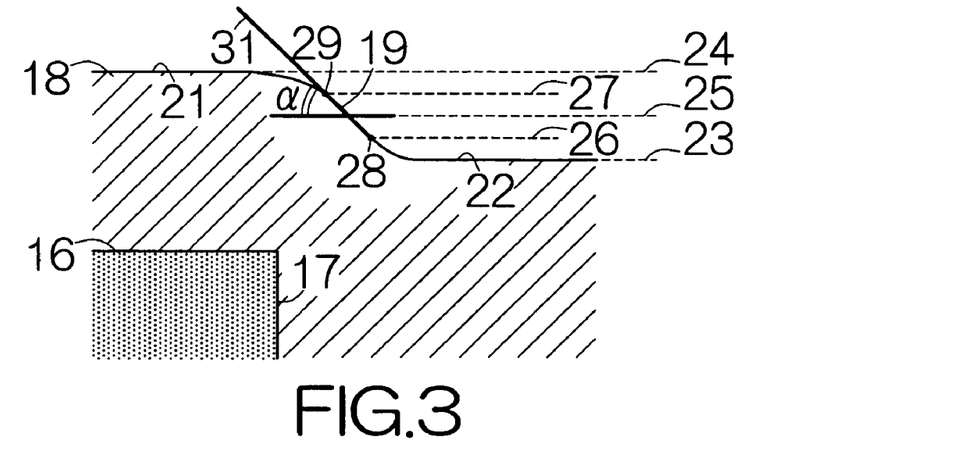
FIG. 3 is an enlarged partial vertical sectional view of the magneto-optical disk along a recording track.

Here, a brief description will be made on how to determine the inclination angle α. FIG. 3 illustrates an enlarged partial vertical sectional view taken along a recording track. The upper end of the inclined surface 19 is connected to an upper flat surface 21. The lower end of the inclined surface 19 is connected to a lower flat surface 22. A first reference plane 23 is defined in parallel with the surface of the medium body 12, namely of a substrate. The lower surface 22 extends within the first reference plane 23. A second reference plane 24 is defined in parallel with the first reference plane 23. The upper flat surface 21 extends within the second reference plane 24. Specifically, the distance between the first and second reference planes 23, 24 corresponds to the height of the upper flat surface 21 from the lower flat surface 22.

A first intermediate reference plane 25 is defined between the first and second reference planes 23, 24. The first intermediate reference plane 25 extends in parallel with the first and second reference planes 23, 24. The first intermediate reference plane 25 is equally distanced from the first reference plane 23 and the second reference plane 24.

A second intermediate plane 26 is defined between the first reference plane 23 and the first intermediate reference plane 25. The second intermediate reference plane 26 extends in parallel with the first reference plane 23 and the first intermediate reference plane 25. The second intermediate reference plane 26 is equally distanced from the first reference plane 23 and the first intermediate reference plane 25.

Likewise, a third intermediate plane 27 is defined between the first intermediate reference plane 25 and the second reference plane 24. The third intermediate reference plane 27 extends in parallel with the first intermediate reference plane 25 and the second reference plane 24. The third intermediate reference plane 27 is equally distanced from the first intermediate reference plane 25 and the second reference plane 24.

The inclined surface 19 intersects with the second intermediate reference plane 23 at a first intersection 28. The inclined surface 19 also intersects with the third intermediate reference plane 27 at a second intersection 29. A straight line 31 is designed to connect the first and second intersections 28, 29 to each other. The inclination angle α can be measured between the straight line 31 and the first intermediate reference plane 25.

Figure 4:
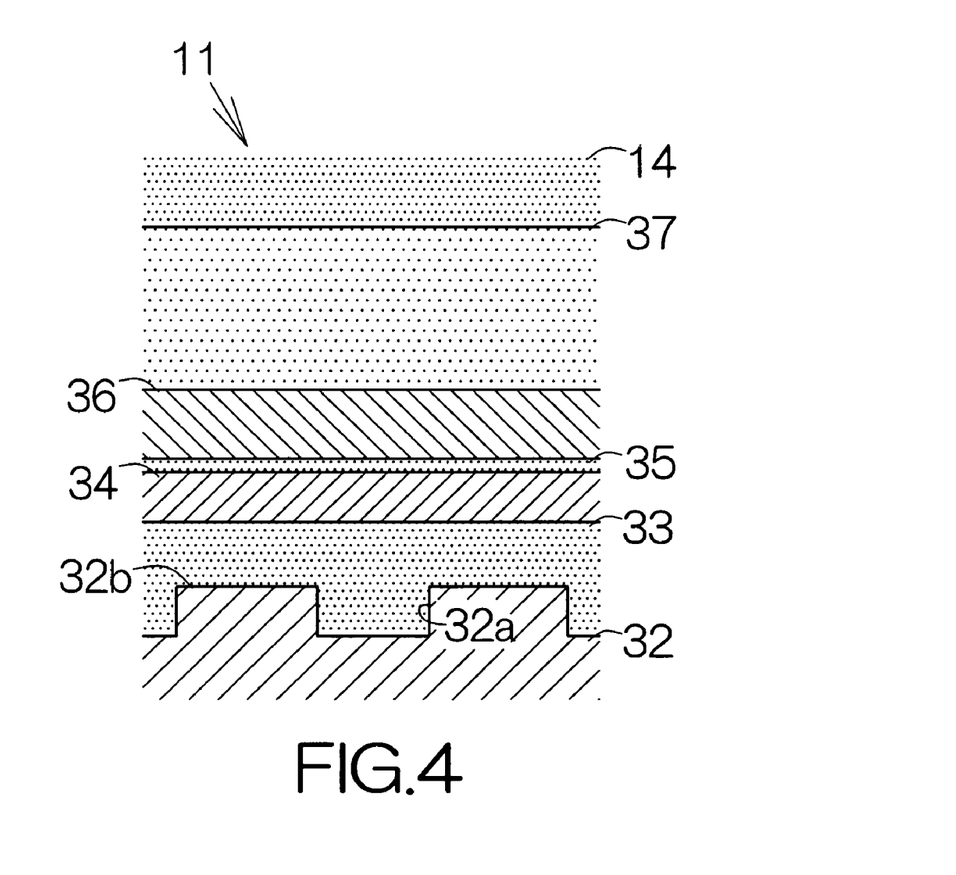
FIG. 4 is an enlarged partial vertical sectional view of the magneto-optical disk for illustrating the structure of a medium body.

FIG. 4 illustrates a sectional view of the medium body 12. The medium body 12 includes a substrate 32 as a support body. The substrate 32 may be made of a transparent material, for example. Such a material may be a resin material such as polycarbonate, acrylic, polyolefin, or the like. A groove 32a is formed on the surface of the substrate 32. The groove 32a spirally extends on the surface of the substrate 32 around the center of the substrate 32, for example. The groove 32a serves to guide the passage of a related optical head. A land 32b is established between the adjacent turns of the groove 32a. The land 32b provides a recording track.

A first dielectric layer 33 extends on the surface of the substrate 32. A SiN film may be employed as the first dielectric layer 33, for example. A magnetic recording layer or magneto-optical recording layer 34 is received on the surface of the first dielectric layer 33. Magnetic information is recorded in the magneto-optical recording layer 34. A TbFeCo film may be employed as the magneto-optical recording layer 34, for example.

A second dielectric layer 35 is received on the surface of the magneto-optical recording layer 34. A SiN film may be employed as the second dielectric layer 35 in the same manner as the first dielectric layer 33. A reflection layer 36 is received on the surface of the second dielectric layer 35. An aluminum film may be employed as the reflection layer 36, for example. A protection layer 37 extends on the surface of the reflection layer 36. An ultraviolet setting resin may be employed to form the protection layer 37, for example.

Figure 5:
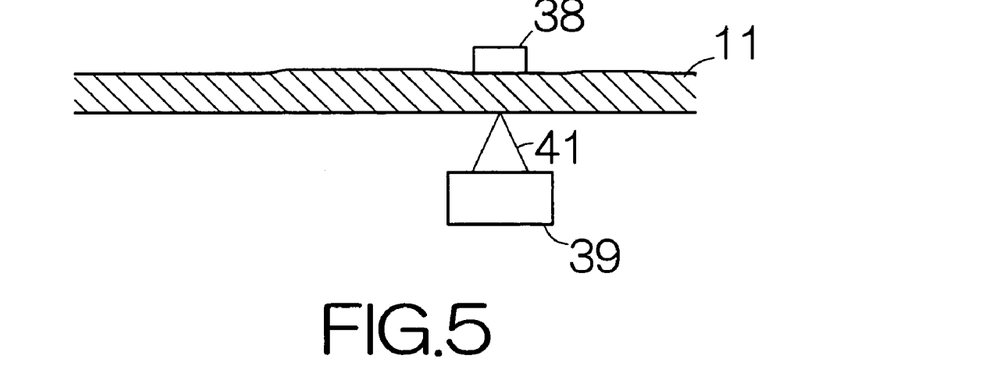
FIG. 5 is an enlarged partial vertical sectional view of the magneto-optical disk for explanation of write operation.

Now, assume that magnetic information is written into the magneto-optical disk 11. A driving motor, not shown, drives the magneto-optical disk 11 for rotation. As shown in FIG. 5, a magnetic head 38 slides on the front surface of the magneto-optical disk 11. An optical head 39 is opposed to the back surface of the magneto-optical disk 11. The magnetic head 38 and the optical head 39 traces the identical position on the recording track on the magneto-optical disk 11.

The magnetic head 38 is allowed to apply a magnetic field to the magneto-optical recording layer 34, while the optical head 39 irradiates a laser beam 41 toward the magneto-optical recording layer 34. The laser beam 41 raises the temperature in the magneto-optical recording layer 34. The rise in the temperature induces a reduction in the coercivity of the magneto-optical recording layer 34. This reduced coercivity allows establishment of magnetization in a predetermined direction in response to the applied magnetic field from the magnetic head 38. When the laser beam 41 from the optical head 39 has passed away, the temperature decreases in the magneto-optical recording layer 34. The established magnetization is thus set stable in the magneto-optical recording layer 34 in the predetermined direction. The magnetic information is thus recorded in the magneto-optical recording layer 34.

Next, assume that the magnetic information is read out of the magneto-optical disk 11. The magneto-optical disk 11 is driven for rotation in the same manner as described above. The optical head 39 is positioned at a predetermined position on the recording track on the back surface of the magneto-optical disk 11. The laser beam 41 of a predetermined power is irradiated from the optical head 39 toward the magneto-optical disk 11. The power of the laser beam 41 during the read operation is set smaller than that during the write operation. The laser beam 41 passes through the magneto-optical recording layer 34. The laser beam 41 then reflects at the reflection layer 36. The reflected laser beam 41 again passes through the magneto-optical recording layer 34. The plane of polarization is rotated in the laser beam 41 based on the magnetization fixed in the magneto-optical recording layer 34. A photoelectric transducer, not shown, detects the intensity of the laser beam 41 so as to determine the rotation of the plane of polarization in the laser beam 41. The magnetic information is thus read out of the magneto-optical recording layer 34.

The magneto-optical disk 11 allows establishment of the inclination angle α with respect to the inclined surface 19, so that the magnetic head 38 smoothly slides on the surface of the print protection layer 18. Collision can be avoided between the magnetic head 38 and the print protection layer 18. A superior relative movement can reliably be established between the magnetic head 38 and the magneto-optical disk 11. Magnetic information can reliably be written into the magneto-optical recording layer 34.

Next, a detailed description will be made on a method of making the magneto-optical disk 11. The substrate 32 of a disk shape is first prepared. Injection molding may be employed to form the substrate 32, for example. The first dielectric layer 33, the magneto-optical recording layer 34, the second dielectric layer 35 and the reflection layer 36 are sequentially formed on the surface of the substrate 32. Sputtering is employed to form the layers 33-36, for example. The substrate 32 is set in a sputtering apparatus. In this case, a SiN film is employed as the first dielectric layer 33. A TbFeCo film is employed as the magneto-optical recording layer 34. A SiN film is employed as the second dielectric layer 35. An aluminum film is employed as the reflection layer 36.

The protection layer 37 is formed on the surface of the reflection layer 36. Spin coating is employed to form the protection layer 37. The substrate 32 is mounted on a spin coater. A drop of an ultraviolet setting resin is dropped on the surface of the substrate 32. The ultraviolet setting resin may be dropped near the center of the substrate 32. The rotation of the substrate 32 allows the ultraviolet setting resin to spread over the surface of the substrate 32. Subsequent irradiation of ultraviolet causes the ultraviolet setting resin to get hardened. The protection layer 37 is in this manner formed on the surface of the reflection layer 36.

The basement print layer 14 is then formed on the surface of the protection layer 37. Screen printing is effected to form the basement print layer 14. The substrate 32 is set in a screen printing machine. In this case, a white ultraviolet setting resin ink is employed, for example. The ink is applied to the surface of the protection layer 37. Ultraviolet is thereafter irradiated on the substrate 32. The ultraviolet setting resin ink thus gets hardened. The basement print layer 14 is in this manner formed on the surface of the protection layer 37.

The first and second print layers 15, 16 are then formed on the surface of the basement print layer 14. Offset process is effected to form the first and second print layers 15, 16. Here, ultraviolet setting resin inks of three primary colors are employed, for example. The inks of single primary colors or of mixture of primary colors are applied to the surface of the basement print layer 14. Ultraviolet is thereafter irradiated on the substrate 32. The ultraviolet setting resin ink thus gets hardened. The first and second print layers 15, 16 are in this manner formed on the surface of the basement print layer 14. The thickness of the first and second print layers 15, 16 depends on the content of inks in the mixture, the kind of pigment, the kind of additive, and the like. The medium body 12 is in this manner allowed to hold the first and second print layers 15, 16 on the surface of the substrate 32. It should be noted that electrophotographic printing may be employed to form the first and second print layers 15, 16.

Figure 6:
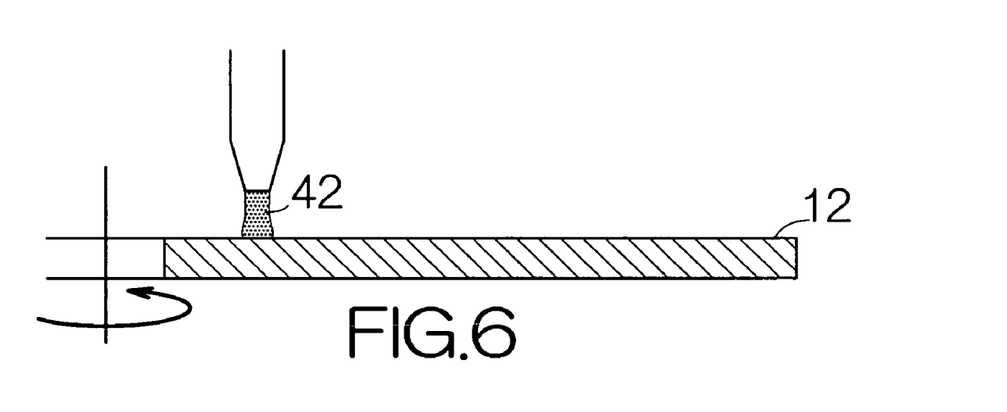
FIG. 6 is an partial sectional view of the magneto-optical disk for illustrating a process of applying a drop of fluid of resin material to the surface of the medium body.

The print protection layer 18 is formed on the surface of the first and second print layers 15, 16. Spin coating is employed to form the print protection layer 18, for example. The medium body 12 is mounted on a spin coater. The medium body 12 is driven for rotation at a first velocity for a predetermined duration or period. Here, the first velocity is set at 10 rpm. As shown in FIG. 6, a drop of fluid of a resin material is dropped on the surface of the first and second print layers 15, 16. The resin material may be dropped at the center of the medium body 12. A transparent ultraviolet setting resin may be employed as the fluid 42 of the resin material, for example.

Figure 7:
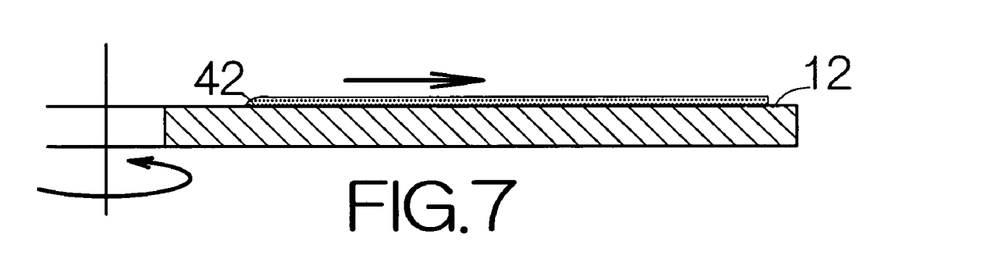
FIG. 7 is an partial sectional view of the magneto-optical disk for illustrating a process of spreading the fluid over the surface of the medium body based on rotation of the medium body.

The medium body 12 is then driven for rotation at a second velocity larger than the first velocity for a predetermined duration. Here, the second velocity is set at 500 rpm. As shown in FIG. 7, the fluid 42 is forced to spread over the surface of the medium body 12 based on the centrifugal force.

Figure 8:
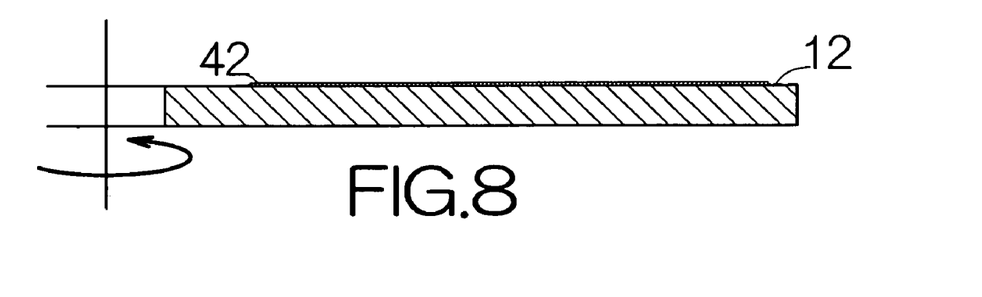
FIG. 8 is an partial sectional view of the magneto-optical disk for illustrating a process of further spreading the fluid over the surface of the medium body based on rotation of the medium body.

Subsequently, the medium body 12 is driven for rotation at a third velocity larger than the second velocity for a predetermined duration. Here, the third velocity is set at 5,000 rpm. As shown in FIG. 8, the fluid 42 further spreads over the surface of the medium body 12. Here, the duration of the rotation at the third velocity is set shorter than the duration of the rotation at the second velocity. The print protection layer 18 is in this manner formed. The inclined surfaces 19 are formed on the surface of the print protection layer 18 based on the steps 17. The aforementioned inclination angle α can be established.

Next, the inventors have observed the relationship between the average thickness of the print protection layer 18 and the inclination angle α. First to seventh examples were prepared in the aforementioned manner. Here, the diameter of the substrate 32 was set at 120 mm. Different values were set for the average thicknesses of the print protection layers 18 in the respective examples. The average thickness was calculated from the maximum and minimum thicknesses of the print protection layer 18. The inclination angle α was measured. A measurement instrument utilizing a contact needle was used to measure the inclination angle α. It has been confirmed that an increased average thickness of the print protection layer 18 causes a reduction in the inclination angle α.

Figure 9:
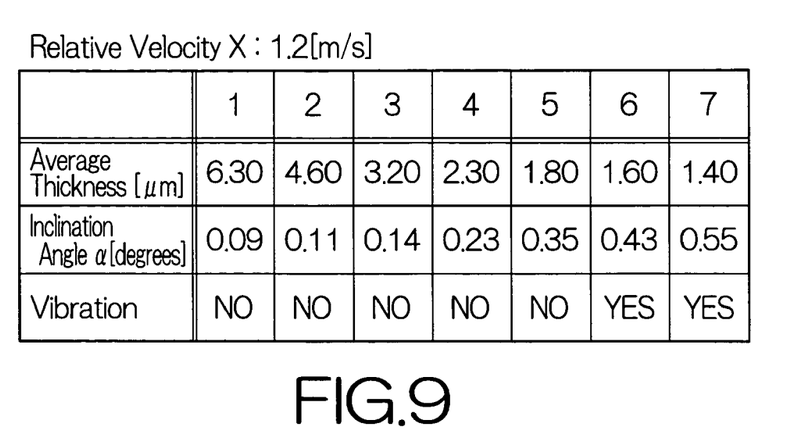
FIG. 9 is a table showing the result of an observation.

The inventors have then observed the sliding characteristics of the magnetic head on the magneto-optical disk 11. The aforementioned first to seventh examples were again prepared. A relative velocity X was set at 1.2[m/s] between the recording track on the medium body 12 and the magnetic head. The magnetic head was caused to slide on the surface of the print protection layer 18 based on the rotation of the medium body 12. As shown in FIG. 9, it has been confirmed that the inclination angel α equal to or smaller than 0.35 degrees reliably avoids collision between the magnetic head and the surface of the print protection layer 18. In other words, the magnetic head was allowed to slide on the surface of the print protection layer 18 in a superior condition. The magnetic head 18 collided against the surface of the print protection layer 18 when the inclination angle α was set larger than 0.35 degrees. The magnetic head vibrated hard in this case.

Figure 10:
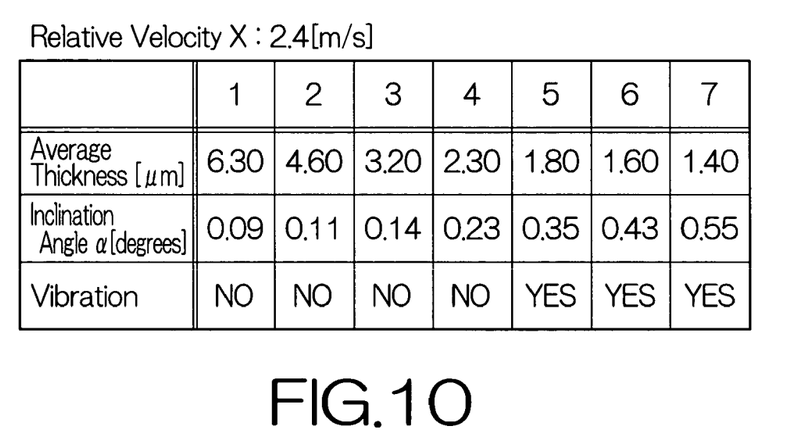
FIG. 10 is a table showing the result of the observation.

Next, the inventors have thereafter set the relative velocity X between the recording track and the magnetic head at 2.4[m/s]. The aforementioned first to seventh examples were again prepared. As shown in FIG. 10, it has been confirmed that the inclination angel α equal to or smaller than 0.23 degrees reliably avoids collision between the magnetic head and the surface of the print protection layer 18. In other words, the magnetic head was allowed to slide on the surface of the print protection layer 18 in a superior condition. The magnetic head 18 collided against the surface of the print protection layer 18 when the inclination angle α was set larger than 0.23 degrees. The magnetic head vibrated hard in this case.

Figure 11:
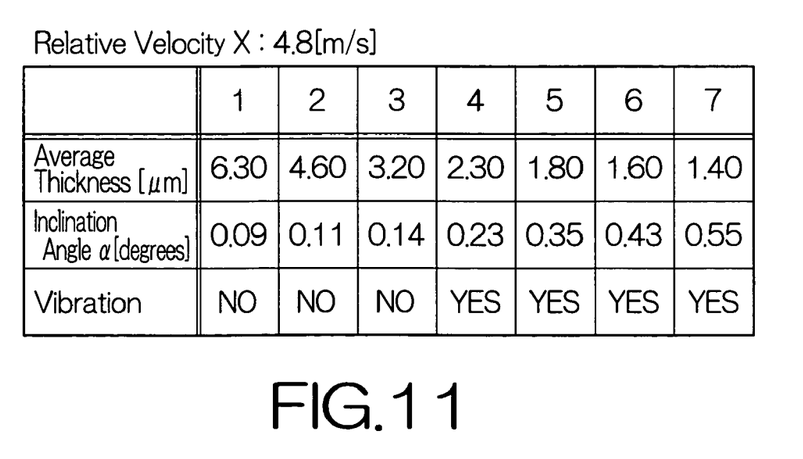
FIG. 11 is a table showing the result of the observation.

Next, the inventors have thereafter set the relative velocity X between the recording track and the magnetic head at 4.8[m/s]. The aforementioned first to seventh examples were again prepared. As shown in FIG. 11, it has been confirmed that the inclination angel α equal to or smaller than 0.14 degrees reliably avoids collision between the magnetic head and the surface of the print protection layer 18. In other words, the magnetic head was allowed to slide on the surface of the print protection layer 18 in a superior condition. The magnetic head 18 collided against the surface of the print protection layer 18 when the inclination angle α was set larger than 0.14 degrees. The magnetic head vibrated hard in this case.

Figure 12:
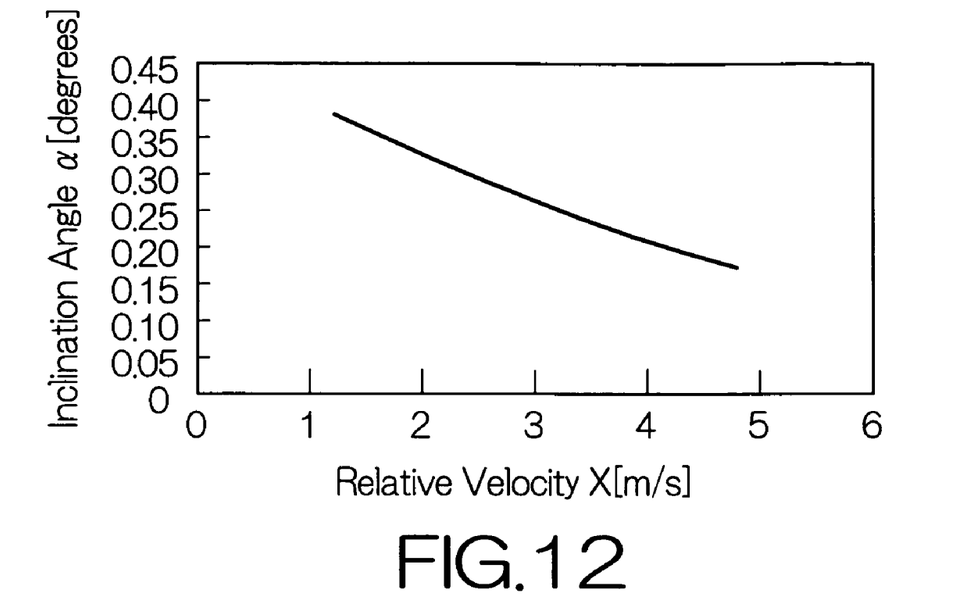
FIG. 12 is a graph showing the relationship between the maximum angle Y of the inclination angle α and the relative velocity between the recording track and a magnetic head.

From the foregoing, the inventors have derived the correlation between the relative velocity X[m/s] and the inclination angle α. As shown in FIG. 12, the larger the relative velocity X gets, the smaller the inclination angle α is set. The correlation can be represented by the following expression:

$$\alpha < 0.49 \cdot e^{-0.20X} \quad (1)$$

Figure 13:
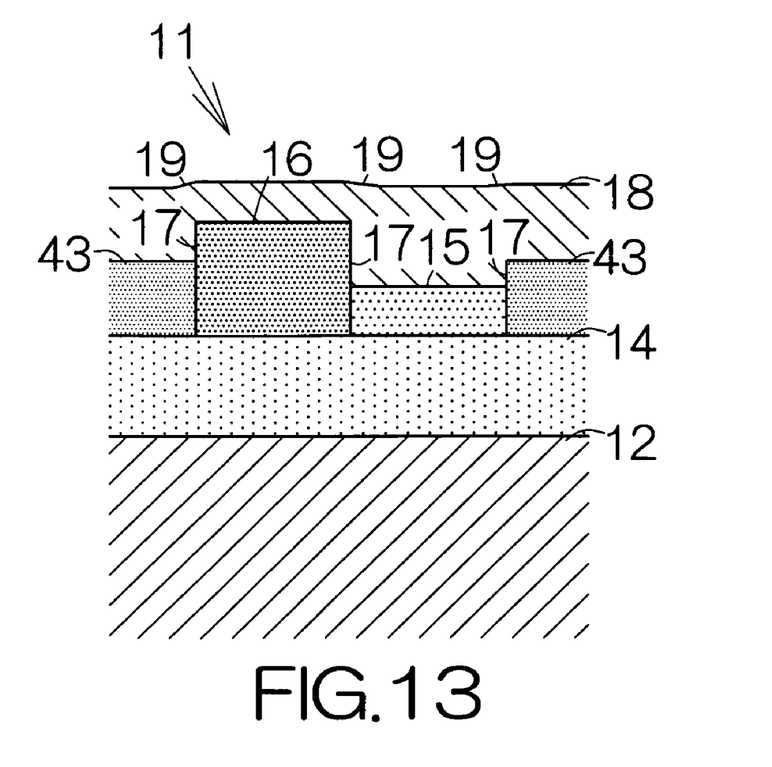
FIG. 13 is an enlarged partial vertical sectional view of a magneto-optical disk according to a modification of the first embodiment.

Otherwise, a third print layer 43 may be formed on the surface of the basement print layer 14 in addition to the first and second print layers 15, 16, as shown in FIG. 13. The third print layer 43 may have a thickness ranging between the first thickness of the first print layer 15 and the second thickness of the second print layer 16. An ultraviolet setting resin ink is employed to form the third print layer 43 in the same manner as described above. The first to third print layers 15, 16, 43 extend all over a recording area of the magneto-optical disk 11. It should be noted that the recording area corresponds to an area holding data in the magneto-optical recording layer 34.

The steps 17 are defined at the boundary between the second print layer 16 and the first print layer 15 and between the second print layer 16 and the third print layer 43. The steps 17 are also defined at the boundary between the third print layer 43 and the first print layer 15. The surface of the print protection layer 18 provides asperities reflecting the steps 17. The inclined surfaces 19 relative to the surface of the medium body 12 are formed on the print protection layer 18. The inclined surfaces 19 descend outward from the contour of the second print layer 16. The inclined surfaces 19 likewise descends outward from the contour of the third print layer 43. Here, an inclination angle $\alpha$ is set smaller than $0.49e^{-0.20X}$, where X[m/s] denotes a relative velocity between a recording track on the medium body 12 and a magnetic head, between the inclined surface 19 and the surface of the medium body 12.

Figure 14:
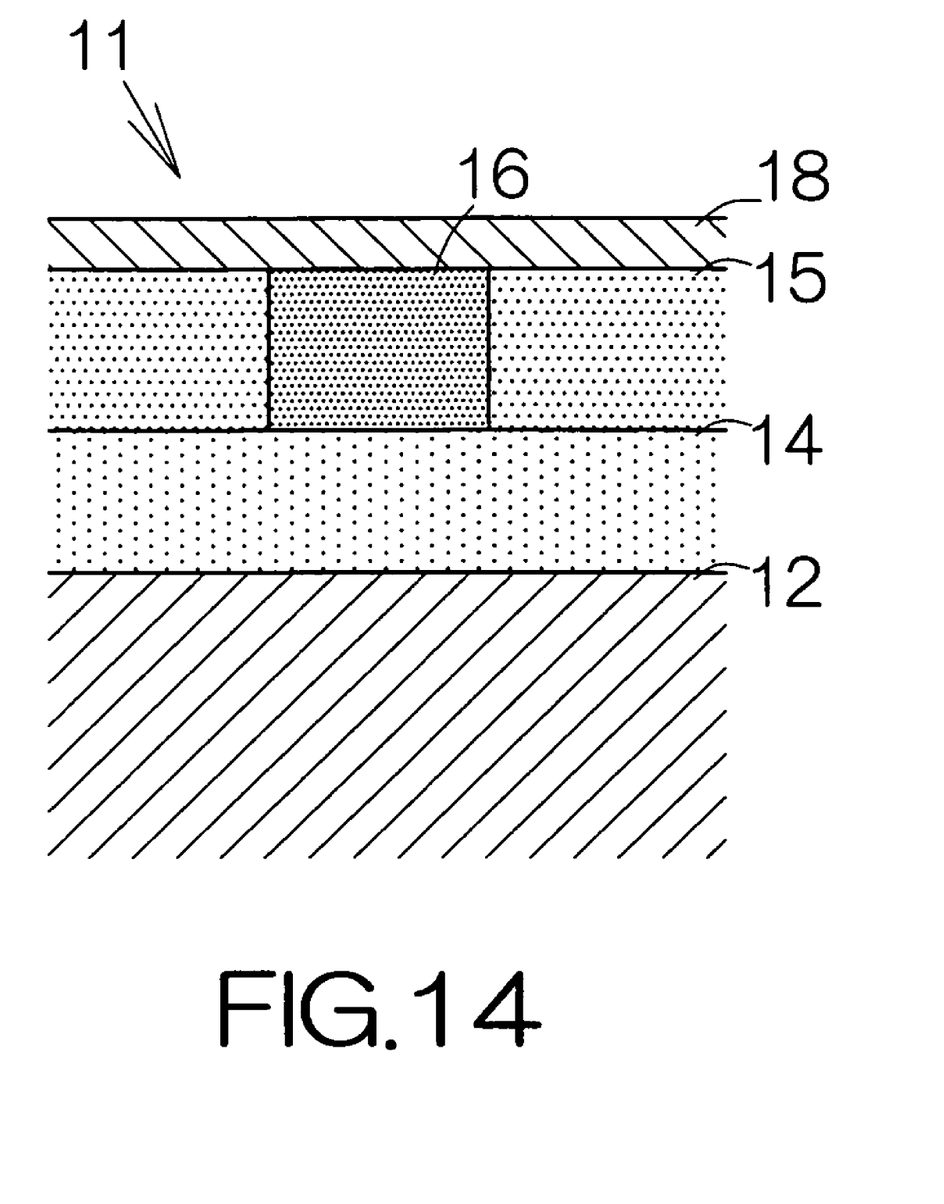
FIG. 14 is an enlarged partial vertical sectional view of a magneto-optical disk according to a second embodiment of the present invention.

FIG. 14 is a sectional view of a magneto-optical disk 11 according to a second embodiment of the present invention. As shown in FIG. 14, the first and second print layers 15, 16 have an equal thickness. The first and second print layer 15, 16 extend all over the recording area on the magneto-optical disk 11. Mixture of the primary colors is applied to the first and second print layers 15, 16, for example. The reference thickness is set at the first print layer 15, for example. The thickness of the second print layer 16 may be set based on the reference thickness. The content of inks in the mixture may be adjusted to set the thickness. Here, the content of inks in the mixture is adjusted to set the equal thickness for the first and second print layers 15, 16. Like reference numerals are attached to components and structure equivalent to those of the aforementioned embodiment.

The second print layer 16 is located adjacent the fist print layer 15. The boundary between the first and second print layer 15, 16 crosses the recording track on the medium body 12. The first and second print layers 15, 16 have the equal thickness, so that no steps are formed at the boundary between the first and second print layers 15, 16. No inclined surfaces are formed on the surface of the print protection layer 18. Collision can reliably be avoided between a related magnetic head and the print protection layer 18. The magnetic head smoothly slides on the surface of the print protection layer 18. A superior relative movement can reliably be established between the magnetic head 28 and the magneto-optical disk 11. Magnetic information can reliably be written into the magneto-optical recording layer 34.

A lubricating agent may be added to the print protection layer 18, for example. The lubricating agent serves to reduce friction against the print protection layer 18.

Any other structure may be applied to the layers in the magneto-optical disk 11. Any other material may be employed to form the layers in the magneto-optical disk 11. The structure and material are not limited to those utilized in the aforementioned embodiments. Three or more print layers having different thicknesses may be employed in the magneto-optical disk 11, for example. The print layer may be formed in contact with the surface of the protection layer 37. In other words, the basement print layer 14 may be omitted. The magneto-optical disk 11 may be shaped in a rectangle or the like.

Otherwise, the magneto-optical disk 11 may be applied to a co-called concurrent ROM-RAM magneto-optical disk. The concurrent ROM-RAM magneto-optical disk 11 allows establishment of random access memory (RAM) information in the magneto-optical recording film formed on the surface of the substrate in the same manner as the magneto-optical disk 11. In addition, phase pits have been defined on the surface of a substrate. Read only memory (ROM) information is written into the magneto-optical disk 11 based on the phase pits.

What is claimed is:

1. A recording medium comprising:
    a medium body holding data;
    a first print layer extending on a surface of the medium body, said first print layer having a first thickness;
    a second print layer extending on the surface of the medium body, said second print layer having a second thickness larger than the first thickness; and
    a print protection layer covering over the first and second print layers on the surface of the medium body, said print protection layer having an inclined surface formed at a boundary between the first and second print layers and inclined relative to the surface of the medium body,
    wherein an inclination angle is set smaller than $0.49e^{-0.2x}$ [degrees] between the inclined surface and the surface of the medium body where X[m/s] denotes a relative velocity between a recording track on the medium body and a head, wherein X is approximately equal to 1.2-4.8 [m/s].

2. The recording medium according to claim 1, wherein said inclined surface descends outward from a contour of the second print layer.

3. The recording medium according to claim 2, wherein said inclined surface descends outward from a contour of the first print layer.

4. The recording medium according to claim 1, wherein said first and second print layers are located adjacent each other.

5. The recording medium according to claim 1, wherein said medium body comprises a magnetic recording layer extending on a surface of a substrate.

6. The recording medium according to claim 5, wherein said substrate is made of a transparent material.

7. The recording medium according to claim 1, wherein at least said second print layer is printed in mixture of primary colors.

8. A method of making a recording medium, according to claim 1 comprising:
    preparing a medium body holding a print layer on a surface of a substrate, said print layer printed in colors;
    dropping a drop of fluid of a resin material during rotation of the medium body at a first velocity;
    driving the medium body for rotation at a second velocity higher than the first velocity so as to spread the fluid over a surface of the print layer based on a centrifugal force; and
    driving the medium body for rotation at a third velocity higher than the second velocity.

9. The method according to claim 8, wherein duration of the rotation at the third velocity is set shorter than duration of the rotation at the second velocity.

* * * * *